Figure 1:
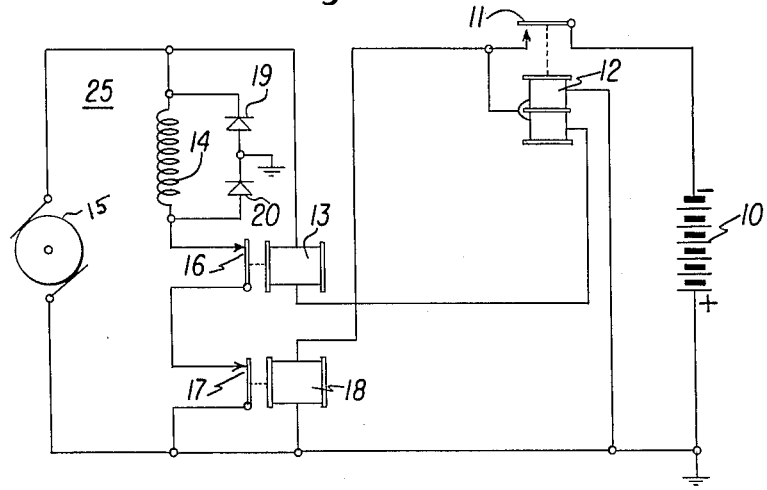

INVENTOR.
Fred P. Hill
BY Foorman L. Mueller
Atty.

ÚnitedStatesPatentOffice 2,746,006
Patented May 15, 1956

2,746,006

VOLTAGE REGULATOR

Fred P. Hill, Elgin, Ill., assignor to Motorola, Inc., Chicago, Ill., a corporation of Illinois Application October 15, 1952, Serial No. 314,839

5 Claims. (Cl. 322—70)

This invention relates to voltage regulators for use in the electrical system of automobiles or the like, and more particularly to an improved voltage regulator of the electro-mechanical type in which arcing of the regulator contacts is reduced to a minimum without the production of noise disturbances in the electrical system capable of interfering with radio equipment incorporated into the automobile and operating from its electrical system.

It is common practice in present day automobiles to derive electrical power from a six or twelve volt storage battery having a charging generator connected in circuit therewith for imparting a charge to the battery when the automobile is in operation. A voltage regulator is usually connected between the generator and battery so that a charging current flows to the battery only when the battery voltage falls below a certain threshold. It has been found that unless some preventative means is provided, serious arcing occurs across the regulator relay contacts each time they break due to the high induction voltage developed in the field winding of the generator. Such arcing causes rapid deterioration of the contacts necessitating their frequent replacement. To reduce arcing of the regulator relay contacts, it has been proposed to connect a unilaterally conductive device, such as a selenium rectifier, in shunt with the field winding. The device is connected with a selected polarity to be non-conductive in the direction of normal unidirectional current flow through the field winding, but to be conductive and essentially short circuit the induction voltage which tends to develop when the regulator contacts are broken. This short circuit across the field winding prevents the building up of large induction voltages which cause serious arcing of the regulator contacts.

Although the above described prior art arrangement has proved highly successful for suppressing arcing of the regulator relay contacts, it has proved to be a source of electrical noise energy, that is extremely difficult to filter out of the car radio. The reason for this is that the unilaterally conductive device presents a high capacity to the radio frequency energy produced by the slight sparking of the regulator contacts which occurs even with such device, and by-passes this energy across the field winding and into the electrical circuit of the automobile. As most automobiles are equipped with radio receivers, this radio frequency energy finds its way into the antenna circuit of the receiver and develops an extremely high volume of noise at the speaker.

It is an object of the present invention to provide an improved voltage regulator for the electrical system of an automobile or the like, which is constructed to suppress arcing of the relay contacts included therein without the production of unwanted noise disturbances in a radio receiver or other electronic equipment that may be incorporated into the automobile.

A feature of the invention is the provision of a pair of series-connected unilaterally conductive devices across the field winding of the charging generator included in the electrical system of the automobile, with the junction of the unilaterally conductive devices being returned to a point of reference potential. The devices function to short circuit the induction voltage which the field winding tends to develop by the opening of the regulator relay contacts and which would otherwise produce serious arcing of such contacts, and at the same time the devices function to by-pass any radio frequency energy produced by the slight residual arcing of the contacts to ground rather than into the electrical system of the receiver to prevent interference by such energy to electronic equipment that may be mounted in the automobile.

Figure 2:
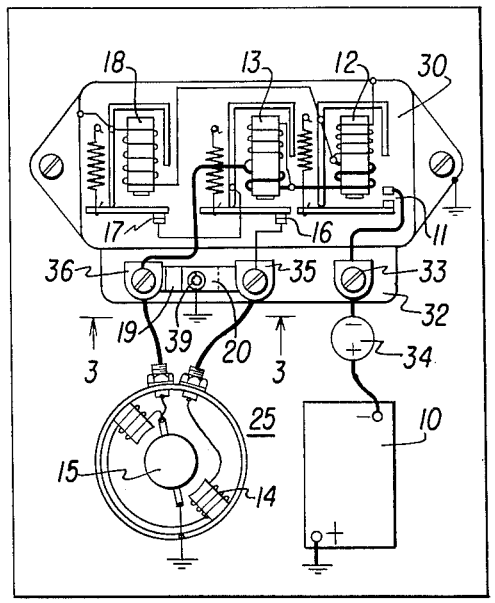
Figure 3:
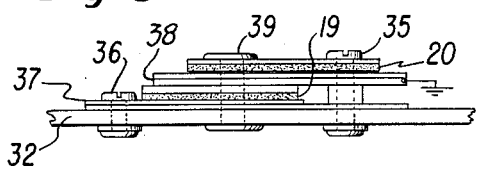

The above and other features of the invention which are believed to be new are set forth with particularity in the appended claims. The invention itself, however, together with further objects and advantages thereof, may best be understood by reference to the following description when taken in conjunction with the accompanying drawing in which:

Fig. 1 shows a wiring diagram of an electrical system for an automobile or the like incorporating the present invention, Fig. 2 shows the mechanical arrangement of the improved voltage regulator of the invention, and Fig. 3 is a view of the regulator taken along the lines 3—3 of Fig. 2.

The improved voltage regulator of this invention has a pair of regulator relay contacts connected in circuit with the field winding of the charging generator of the automobile electrical system into which the regulator is connected, to make and break the current flow through that winding. A pair of series-connected unilaterally conductive devices are connected in circuit with the field winding with a selected polarity to be non-conductive to the unidirectional current flow through the winding but to short circuit the induction voltage that tends to be developed when the aforesaid contacts are broken, and a connection is provided extending from the common junction of the devices to a point of reference potential to by-pass to that point any radio-frequency energy developed by the slight residual arcing of the contacts when they are broken.

As shown in Fig. 1 of the accompanying drawings, the automobile electrical system incorporating this invention includes a battery 10, which may be of the usual six or twelve volt storage type, and has its positive terminal connected to the frame of the automobile designated a point of reference or ground potential. The negative terminal of battery 10 is connected through contact 11 of a cut-out relay 12 and through a current regulator relay 13 to one side of the field winding 14 and armature 15 of a charging generator 25. The other side of armature 15 is connected to the reference potential point, and the other side of field winding 14 is connected to that point through a pair of normally closed contacts 16 of current regulator relay 13 and through a pair of normally closed contacts 17 of a voltage regulator relay 18, the latter relay being connected between the reference potential point and through contact 11 of cut-out relay 12 to the negative terminal of battery 10.

The automobile electrical system and voltage regulator thus far described are extremely well known and a detailed description or discussion thereof is deemed to be unnecessary. It is sufficient to point out that generator 25 supplies a charging voltage to battery 10 through cut-out relay 11 whenever the potential of battery 10 has fallen to such a value that voltage regulator 18 can no longer hold its contact 17 open and the automobile is in motion. When battery 10 is substantially fully charged, contacts 17 may open and close at a relatively high rate under the control of relay 18 and, unless some compensating means is provided, their arcing causes rapid deterioration of these contacts.

In accordance with the present invention, arcing of contacts 17 is greatly reduced by the provision of a pair of series-connected selenium rectifiers, or similar unilaterally conductive devices, 19, 20 which are connected across field winding 14, and which have their common junction connected to the point of reference potential. Rectifiers 19 and 20 are connected with such a polarity so as to be non-conductive to the unidirectional current normally flowing through the field winding 14 during operation of generator 25. However, the polarity of the devices is such that they short circuit the induction voltage which tends to occur across winding 14 each time contacts 17 are broken and which tends to produce serious arcing across the contacts. The rectifiers present a relatively high capacity (for example, of the order of 26,000 micro-microfarads) to radio frequency current produced by the slight residual arcing of the regulator relay contacts 17, unlike prior arrangements, these radio frequency currents are by-passed to ground instead of being fed into the load circuit to interfere with radio receivers or other electronic equipment included in the automobile.

A preferred physical arrangement of the improved voltage regulator of the invention is illustrated in Fig. 2 in which elements corresponding to those shown schematically in Fig. 1 are designated by like numerals. As shown in Fig. 2, the regulator includes a casing 30 which is screwed to the frame 31 of the automobile and established at reference potential. Casing 30 includes a terminal strip 32 which supports terminal 33 connecting the contacts 11 of cut-out relay 12 to the negative terminal of battery 10 through ammeter 34, and which also supports terminals 35 and 36 respectively connecting contacts 16 to field winding 14 and relay 13 to armature 15.

As best shown in Fig. 3, rectifier 19 is supported on strip 32 and insulated therefrom by an insulated strip 37. Terminal 36 makes contact with the bottom plate of rectifier 19 and the top plate of the rectifier is held in contact with a ground foil 38 by an insulated rivet 39 which also holds the bottom plate of rectifier 20 against the ground foil. Terminal 35, on the other hand, makes contact with the top plate of rectifier 20.

The invention provides, therefore, an improved voltage regulator for use in the electrical system of an automobile or the like, and in which means is provided to reduce arcing of the regulator relay contacts to a minimum greatly to prolong the life of such contacts, and in which such means is arranged and connected so that noise disturbances produced thereby which would otherwise affect electronic equipment in the automobile are by-passed to a point of reference potential.

While a particular embodiment of the invention has been shown and described, modifications may be made, and it is intended in the appended claims to cover all such modifications as fall within the true spirit and scope of the invention.

I claim:

1. A voltage regulator for the electrical system of an automobile and the like, said electrical system comprising a battery and a generator having an armature connected in shunt with said battery and further having a field winding, said regulator including in combination, at least one regulator relay having a pair of normally closed contacts, the aforesaid field winding and said contacts being series-connected in shunt with the aforesaid armature, a first selenium rectifier connected between one side of the aforesaid field winding and a point of reference potential, and a second selenium rectifier connected between the other side of the aforesaid field winding and said point of reference potential, said selenium rectifiers being connected with a selected polarity to be nonconductive to the unidirectional current flow from the aforesaid battery in the field winding but to short circuit the induction voltage developed thereacross by breaking of said contacts.

2. A voltage regulator for the electrical system of an automobile and the like, said electrical system comprising a battery having one terminal connected to a point of reference potential and a generator having an armature connected in shunt with said battery and further having a field winding, said regulator including in combination, at least one regulator relay having a pair of normally closed contacts, said contacts connecting the field winding in shunt with the armature, a first device exhibiting relatively high electrical conductivity in one direction and relatively low electrical conductivity in the opposite direction connected between one side of the field winding and said point of reference potential, and a second device exhibiting relatively high electrical conductivity in one direction and relatively low electrical conductivity in the opposite direction connected between the other side of the field winding and said point of reference potential, said first and second devices being connected with a selected polarity to exhibit relatively low conductivity to the potential from the generator producing unidirectional current flow through the field winding when the contacts of said regulator relay are closed and to exhibit relatively high conductivity to the induction voltage developed across the field winding by breaking of said contacts.

3. A voltage regulator for the electrical system of an automobile and the like, said electrical system comprising a battery having one terminal connected to a point of reference potential and a generator having an armature connected in shunt with said battery and further having a field winding, said regulator including in combination, at least one regulator relay having a pair of normally closed contacts, said contacts connecting the field winding in shunt with the armature, a first rectifier connected between one side of the field winding and said point of reference potential, a second rectifier connected between the other side of the field winding and said point of reference potential, said rectifier being connected with a selected polarity to be essentially nonconductive to the voltage from the generator producing unidirectional current flow in the field winding when the contacts of said regulator relay are closed but substantially to short circuit the induction voltage developed across the field winding by breaking of said contacts.

4. A source of voltage for the electrical load circuit of an automobile or the like including in combination, a battery, a generator having an armature connected in shunt with said battery and having a field winding, at least one regulator relay having a pair of normally closed contacts, said contacts connecting said field winding in shunt with said armature, a first device exhibiting high electrical conductivity in one direction as compared with its conductivity in the other direction connected between one side of said field winding and a common junction of said battery and said armature, a second device exhibiting high electrical conductivity in one direction as compared with its conductivity in the other direction connected between the other side of said field winding and said common junction, said first and second devices being connected with a selected polarity to be essentially nonconductive to the voltage of said generator producing unidirectional current flow through said field winding when said contacts are closed but to be highly conductive to the induction voltage developed across said winding by the opening of said contacts.

5. A source of voltage for the electrical load circuit of an automobile or the like including in combination, a battery having one terminal connected to a point of reference potential, a generator having an armature connected in shunt with said battery and having a field winding, at least one regulator relay having a pair of normally closed contacts, said contacts connecting said field winding in shunt with said armature, a first rectifier connected between one side of said field winding and said point of reference potential, a second rectifier connected between the other sides of said field winding and said point of reference potential, said first and second rectifiers being connected with a selected polarity to be essentially nonconductive to the voltage of said generator producing unidirectional current flow through said field winding when said contacts are closed but to be highly conductive to the induction voltage developed across said winding by the opening of said contacts.

References Cited in the file of this patent

UNITED STATES PATENTS

| | | |
|---|---|---|
| 771,820 | De Forest | Oct. 11, 1904 |
| 1,966,077 | Nyman | July 10, 1934 |
| 2,339,858 | Hufnagel | Jan. 25, 1944 |

FOREIGN PATENTS

| | | |
|---|---|---|
| 505,367 | Great Britain | May 9, 1939 |